United States Patent [19]

Kane et al.

[11] 4,005,345

[45] Jan. 25, 1977

[54] MULTI-PHASE GAS-TYPE CIRCUIT-INTERRUPTER SUBSTITUTION MODULAR CONSTRUCTION

[75] Inventors: Richard E. Kane, Monroeville; Charles E. LeRow, Jr., Jeannette, both of Pa.

[73] Assignee: Westinghouse Electric Corporation, Pittsburgh, Pa.

[22] Filed: Nov. 27, 1974

[21] Appl. No.: 527,931

[52] U.S. Cl. .......................... 317/103; 200/148 R; 200/148 D
[51] Int. Cl.² .................. H01H 9/00; H01H 33/54; H02B 1/20
[58] Field of Search ......... 200/82 B, 148 R, 148 B, 200/148 D, 148 F, 148 A; 317/103

[56] References Cited

UNITED STATES PATENTS

| | | | |
|---|---|---|---|
| 2,689,888 | 9/1954 | Latour et al. | 200/148 D X |
| 2,856,480 | 10/1958 | Westerhoff | 200/148 D |
| 2,999,143 | 9/1961 | Baker et al. | 200/148 D |
| 3,566,062 | 2/1971 | Meier et al. | 200/148 E |
| 3,603,752 | 9/1971 | Frink | 200/148 H X |
| 3,794,799 | 2/1974 | Spindle et al. | 200/148 B X |
| 3,863,041 | 1/1975 | Rostron et al. | 200/148 R X |
| 3,879,591 | 4/1975 | Tschannen et al. | 200/148 E |

*Primary Examiner*—James R. Scott
*Attorney, Agent, or Firm*—W. R. Crout

[57] ABSTRACT

A simplified-type of multi-phase compressed-gas circuit-interrupter installation is provided in which costly and complicated I-beam base structures are eliminated, and the low-pressure gas-reservoir tank is so used and located as to provide a lower main support for the circuit-breaker installation. In addition, the high-pressure gas-reservoir tank is so used and located in such a manner that its main supporting brackets become a main support for the circuit-breaker assembly.

The construction is such that a simplified support is provided having the several component parts of the installation so arranged as to be readily accessible for servicing, and arranged together in a new combination for a resultant compact easily maintained arrangement.

6 Claims, 17 Drawing Figures

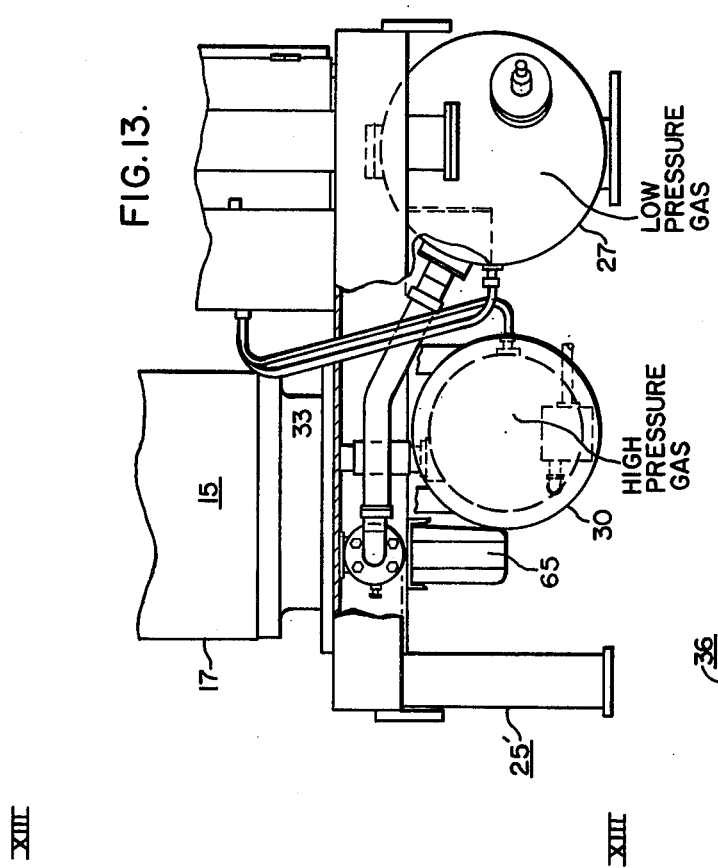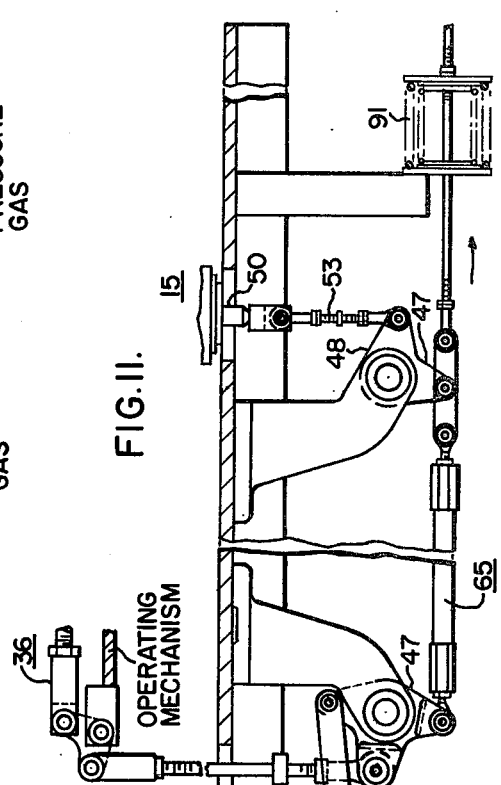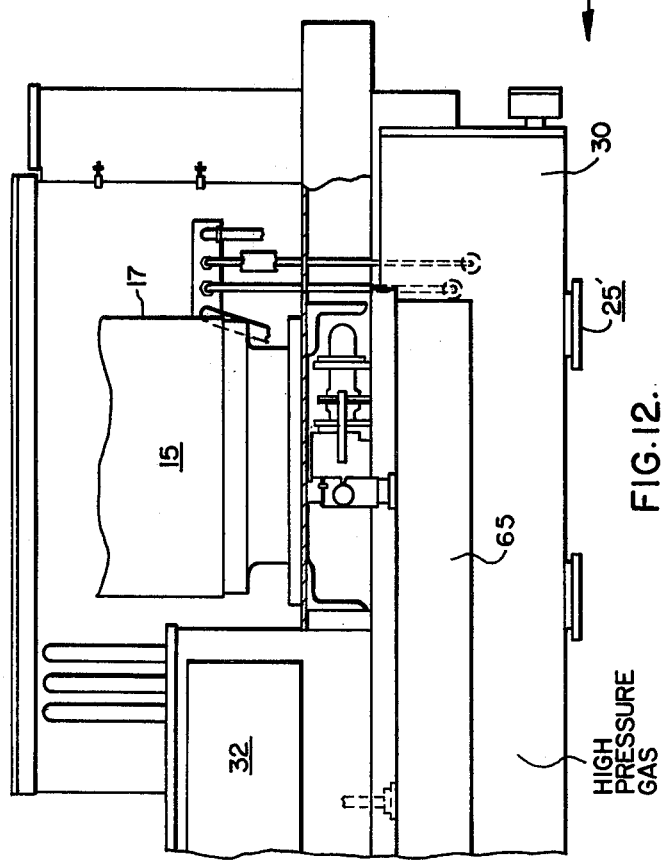

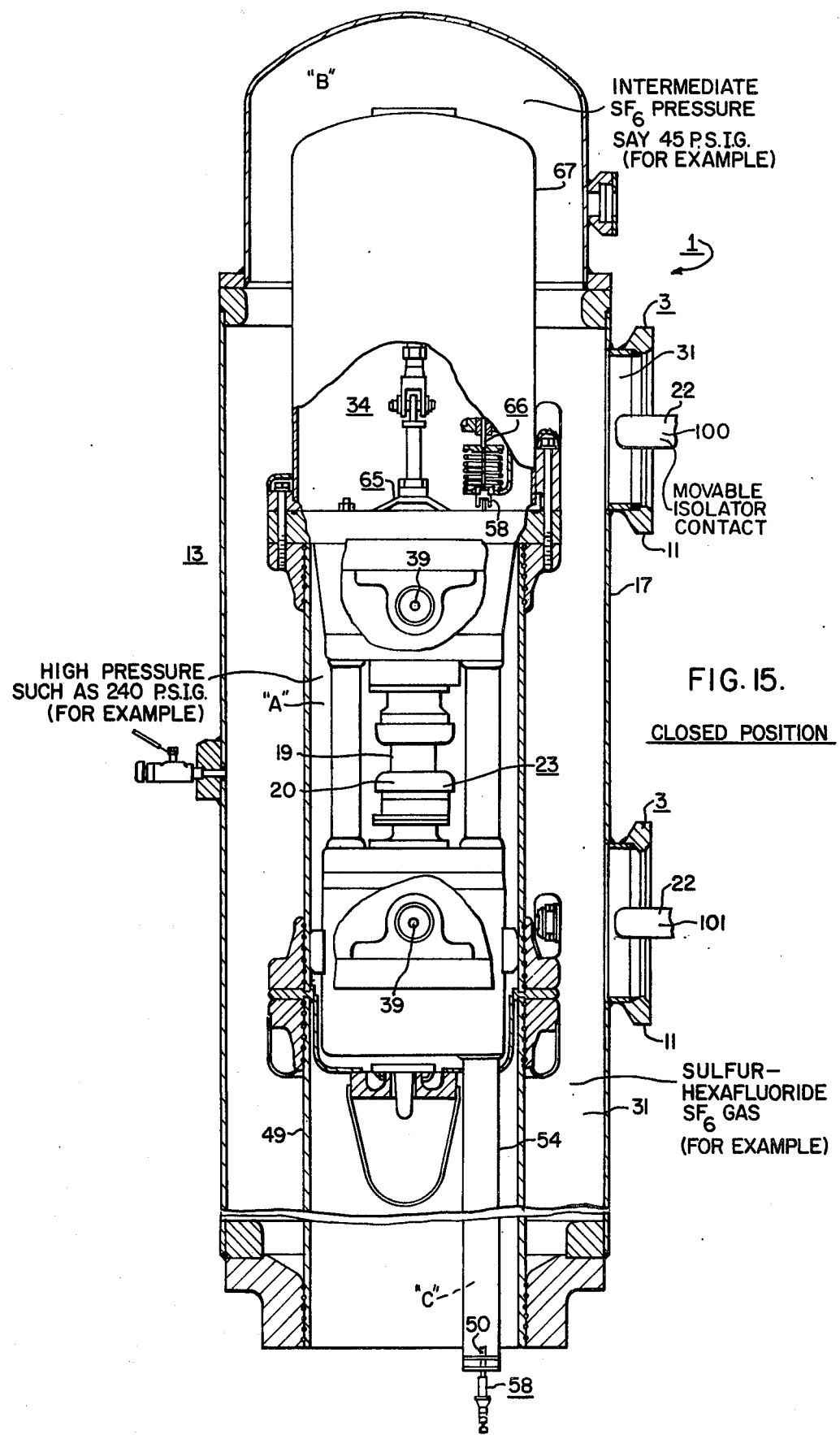

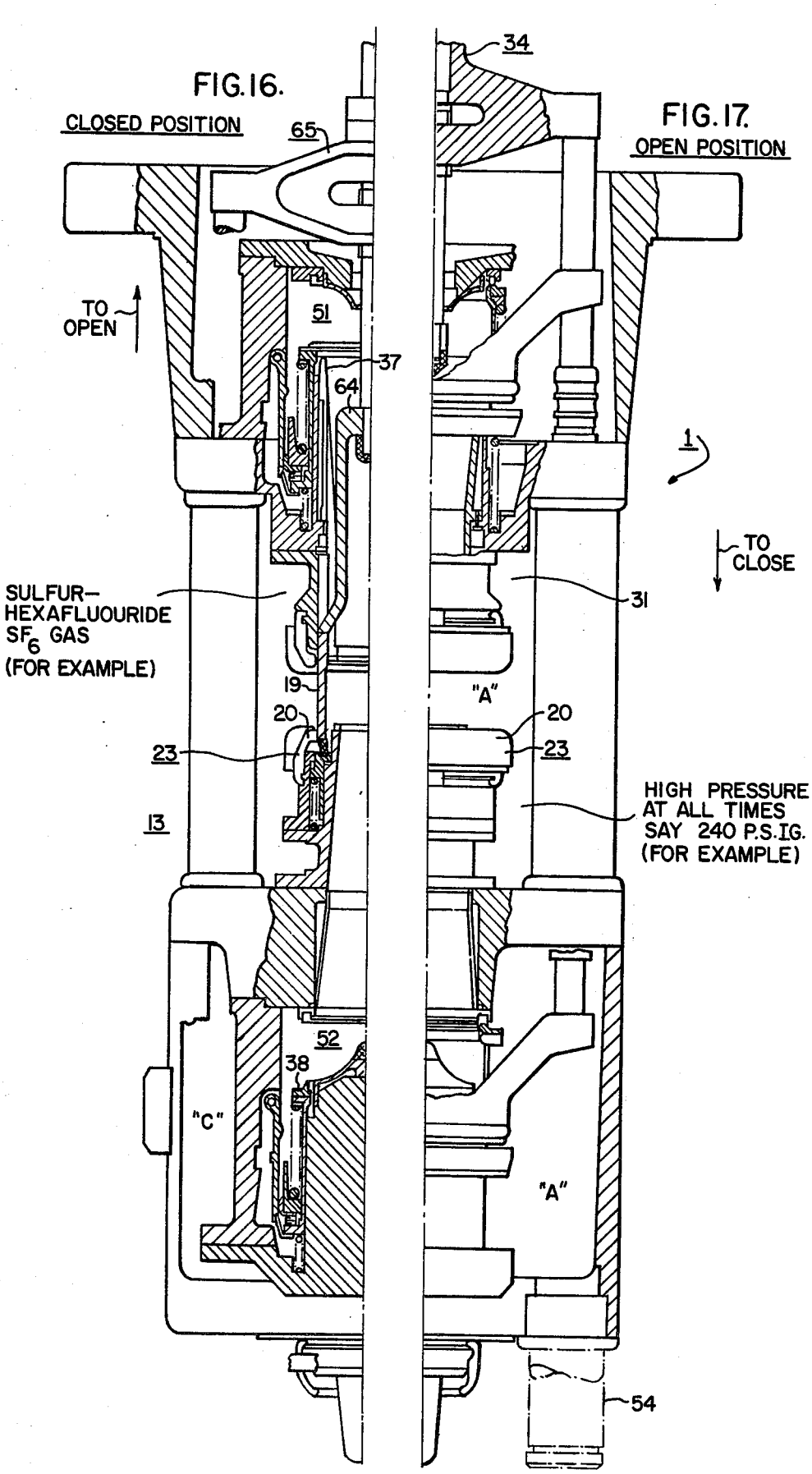

MULTI-PHASE GAS-TYPE CIRCUIT-INTERRUPTER SUBSTITUTION MODULAR CONSTRUCTION

CROSS-REFERENCES TO RELATED APPLICATIONS

Reference may be had to U.S. patent application filed Nov. 11, 1974 Ser. No. 522,960 by Ronald W. Crookston, et al. Also, reference may be had to U.S. patent application filed Nov. 27, 1974 Ser. No. 527,929 by Otto H. Soles, et al. entitled "Compressed-Gas Multiphase Circuit-Breaker Installation". Also, reference may be had to U.S. patent application filed Nov. 24, 1974 Ser. No. 527,930 by Richard E. Kane and Charles LeRow, Jr. relating to the same general type of gas-insulated equipment and entitled "Improved Multiphase Compressed-Gas Circuit-Breaker Construction", all of said patent application being assigned to the assignee of the instant application.

BRIEF SUMMARY OF THE INVENTION

In accordance with the present invention, the low-pressure gas-reservoir tank is so arranged so as to provide the lower main support for the multi-phase compressed-gas circuit-breaker installation. Additionally, the high-pressure gas-reservoir tank is so used and located in such a manner that its main supporting brackets become a main support for the circuit-breaker assembly, involving two or more upstanding gas-type circuit-breaker modules or interrupting assemblies.

BRIEF DESCRIPTION OF THE DRAWINGS

FIG. 11 is a side-elevational view of the operating linkage utilized in simultaneously actuating the individual circuit-breaker modules;

FIG. 12 is a fragmentary side-elevational view of the assembly;

FIG. 13 is a fragmentary end-elevational view taken along the line XIII—XIII of FIG. 12;

FIG. 15 is an enlarged view, somewhat similar to that of FIG. 14, and showing a portion of the high-potential operator, and the casing structure of the circuit-breaker module of FIG. 14;

FIG. 16 is a partial view, somewhat similar to that of FIG. 15, and illustrating the contacts in the closed-circuit position; and, FIG. 17 is a view similar to that of FIG. 16, but illustrating the contacts in their separated open-circuit position.

DESCRIPTION OF THE PREFERRED EMBODIMENT

Figure 2:
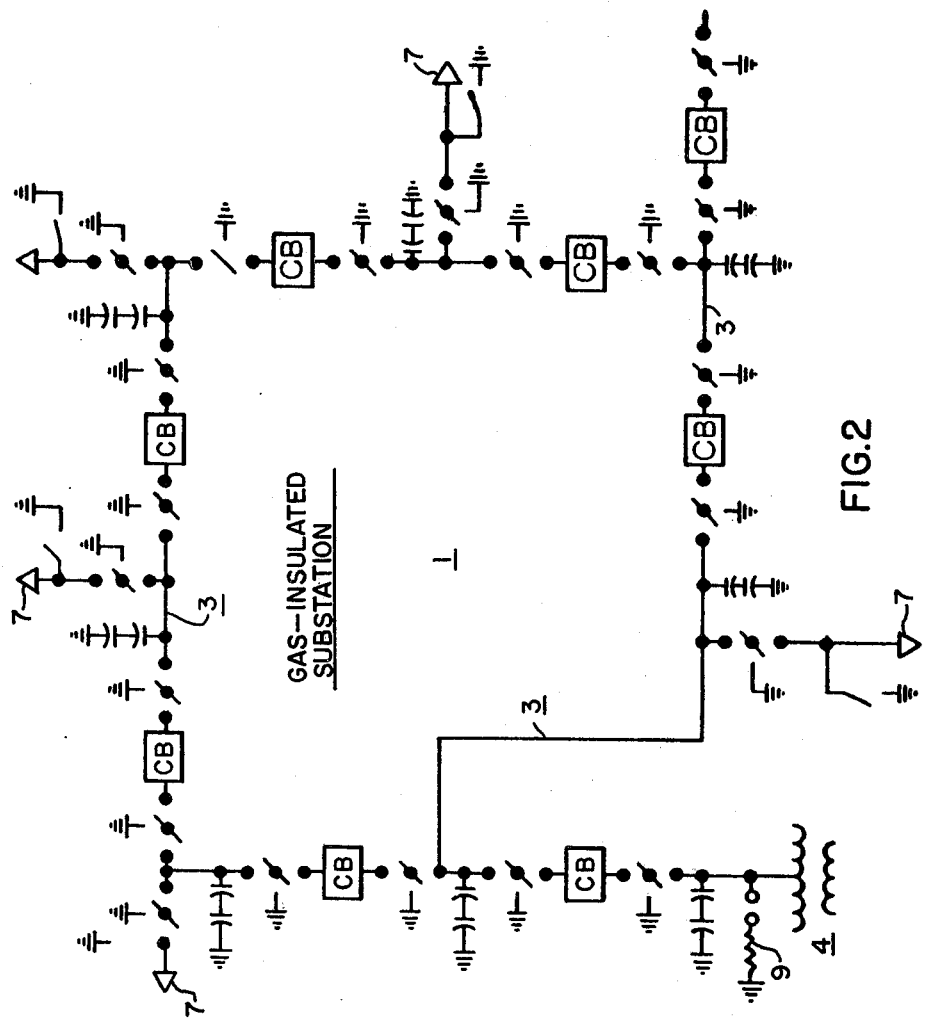
FIG. 2 is a diagrammatic line diagram of the substation installation of FIG. 1.
Figure 1:
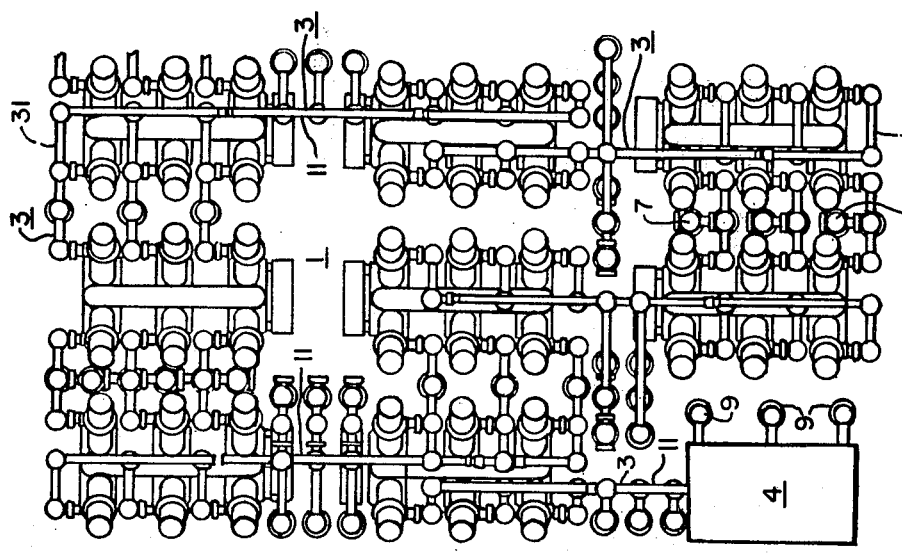
FIG. 1 is a top plan diagrammatic view of a substation utilizing component parts generally similar to those of the present invention, and indicating the general environment or the setting for the present invention.

The present invention has particular application to a line of equipment 1 involving gas-insulated substations having gas-insulated components, and somewhat diagrammatically illustrated in FIGS. 1 and 2 of the drawings.

FIG. 2 is a one-line diagram of the equipment 1 illustrated in FIG. 1. It will be noted, from a consideration of FIGS. 1 and 2, that the high-voltage equipment 1 is arranged so that both the space required, and the total length of the gas-insulated bus 3 is minimized. The power transformer 4 is located on an outside corner of the station, preferably, so that it can be easily removed. The gas-insulated bus 3 is attached directly to the transformer-bushing 5 minimizing area and height required. The location of the cable pothead 7 is flexible. In the gas-insulated system 1, as illustrated in FIGS. 1 and 2, it is chosen to minimize the length of the $SF_6$ bus 3. If a lightning arrester 9 is located at each pothead 7, an arrester 5 is not required at the power-transformer 4.

It will be noted that the gas-insulated system 1 of FIG. 1 can be connected to overhead lines. However, the air clearances, required by incoming power lines, will somewhat enlarge the total area required by the system 1, and will require additional $SF_6$ bus 3.

The gas-insulated transmission system 1, illustrated in FIG. 1, is a line of equipment, which will significantly reduce the space required by the high-voltage side of substations rated 115 K.V. through 345 K.V. The space reduction is accomplished by replacing the open bus and air terminal-busings, commonly used, with gas-insulated bus 3 filled with sulfur-hexafluoride ($SF_6$) gas, for example, at 45 p.s.i.g. (at 70° F.), and moving the component parts of the electrical equipment as close together as possible.

The use of gas-insulated transmission systems 1 offers many advantages. The use of the system 1 offers several advantages to the utility user, some of these are:

1. Significant reduction in space requirements both in land area and overall height.
2. Added system reliability by eliminating the possibility of phase-to-phase faults, lightning strokes within the system 1, or contamination of the environment.
3. Reduced maintenance because the closed system 1 is isolated from its environment.
4. Added personnel safety because all live parts are covered by grounded shields.

5. The modular approach was chosen because it could provide the utility user with lower installation costs when compared with conventional or other gas-insulated systems.
6. The system 1 can be overbuilt to permit multiple use of the land.

Generally, the equipment 1 includes a plurality of bus assemblies 3 determined by the length that can generally be shipped. The typical bus length 3 will be, for example, 40 feet, and may consist of two 20-feet lengths, with an epoxy spacer (not shown) in each length. The ends of the bus 3 can be connected to additional lengths of bus 3, or any functional member of the system 1. Expansion joints are located in each 20-foot bus-section 3 to absorb the maximum of 0.4 inches of expansion expected. As stated, sulfur-hexafluoride ($SF_6$) gas at 45 p.s.i.g., for example, fills both the sheath 11 and the bus conductor 3, and is free to move throughout the entire bus. The 45 p.s.i.g. $SF_6$ gas pressure provides approximately the highest dielectric strength possible down to $-40°$ C. without liquefaction, eliminating the need for auxiliary heat. High-pressure $SF_6$ gas, however, does require a heat input at low ambient temperatures.

Figure 3:
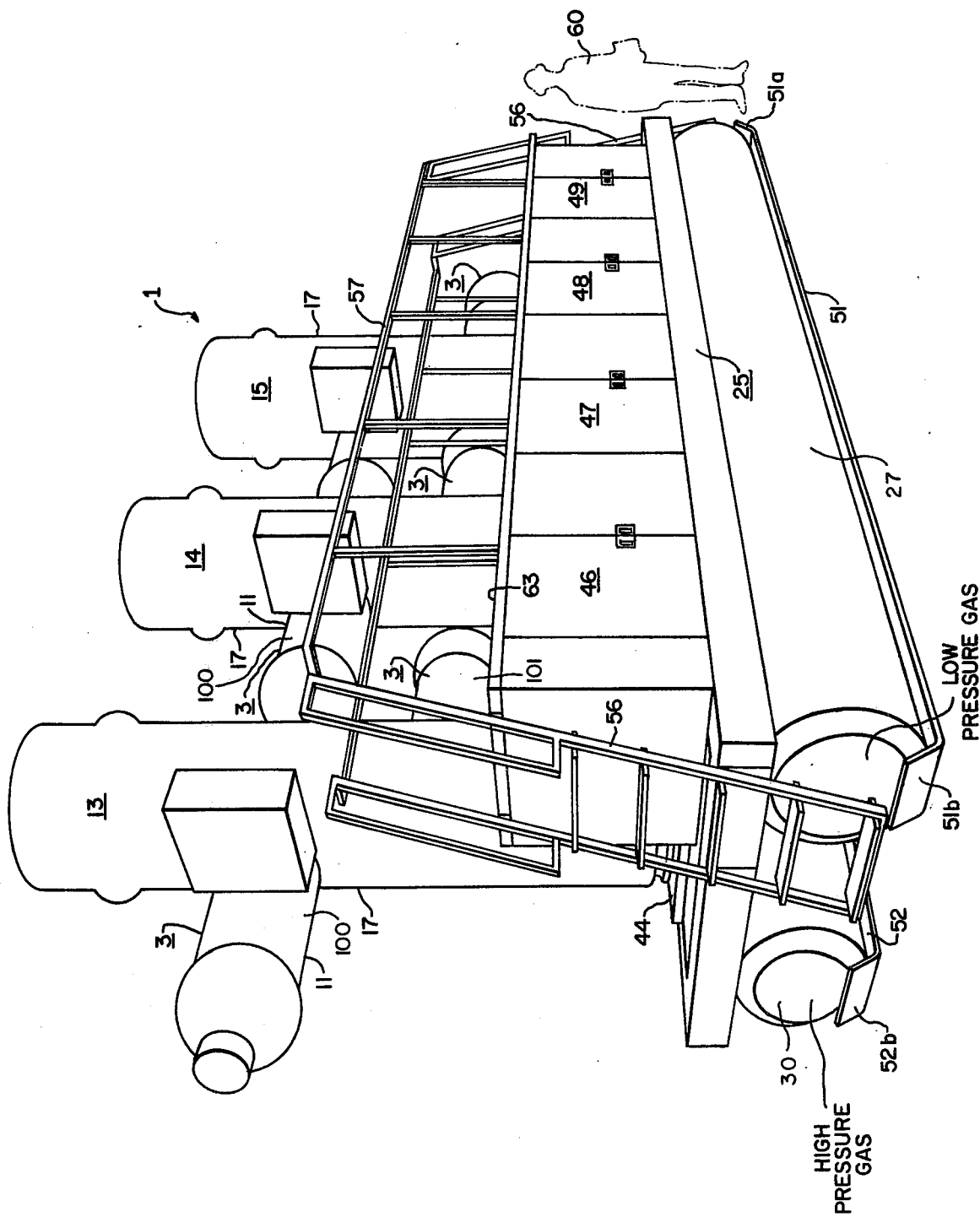
FIG. 3 is a perspective view of the multi-phase compressed-gas circuit-breaker installation of FIGS. 1 and 2, embodying the principles of the present invention, and showing, generally, the height relative to a serviceman standing at the right-hand side of the figure.

With reference to FIG. 3, it will be observed that there are provided three circuit-breaker assemblies, 13, 14 and 15, each including a casing structure 17, as more clearly illustrated in FIG. 15, enclosing separable contacts 19, 20, which are separable to an open position to establish arcing (not shown), and to effect circuit interruption. Reference may be made to the following United States patents for a detailed description of the individual circuit-interrupter assemblies 13, 14 and 15: U.S. Pat. No. 3,590,189, issued June 29, 1971, Kane, et al, U.S. Pat. No. 3,596,028 issued July 27, 1971, Fischer, et al, U.S. Pat. No. 3,639,713 issued Feb. 1, 1972, Fischer, et al, U.S. Pat. No. 3,624,329 issued Nov. 30, 1971, and Reese, et al, U.S. Pat. No. 3,665,133 issued May 13, 1972.

The circuit-breaker modules 23 (FIGS. 15,16) are of high capacity and comprise three single-phase units mounted vertically upon a support frame 25. These breaker-modules 23 use sulfur-hexafluoride ($SF_6$) gas 31 for arc-extinction, insulation and operation. The high-pressure reservoir tank 30 serves as a support for one side. Located on the opposite side of the breaker-modules is a low-pressure gas-reservoir tank 27 also containing $SF_6$ gas 31. This reservoir tank 27 has a dual function. During normal breaker operation, it contains sulfur-hexafluoride gas at a nominal pressure of 10 p.s.i.g., and also provides a main support for one side of the breaker 1 as shown in FIG. 3. This reservoir 27 is an ASME coded vessel. It has a relief valve attached to it and set at 150 p.s.i.g.

The high-pressure reservoir tank 30 is also located beneath the phase-units, or circuit-breaker assemblies 13, 14 and 15, and provides an adequate high-pressure gas supply. The gas reservoir tank 30 contains a heater, and heating of each interrupter assembly 13, 14 or 15 is by convection through two feed pipes 32, (FIG. 4) from this gas reservoir 30. This reservoir 30 is ASME coded. The interrupter columns 13, 14 or 15 each consist of an interrupter-module 23 housed within an outer grounded tank 17, and an operator 34 at the top of the column or assembly, as shown in FIG. 15. The interrupter 23 is located in sulfur-hexafluoride gas 31 at a nominal 245 p.s.i.g.

The interrupter 23 (FIG. 15) is arranged with the contacts 19, 20 surrounded by high-pressure $SF_6$ gas to give a minimum arcing time. On an opening operation, the operator 34 moves the movable interrupter contact 19 upwardly. As contact motion starts, the gas seal is broken to permit high-pressure $SF_6$ gas, surrounding the contacts 19, 20, to start to flow through the hollow contact assembly. Contact overlap permits the moving contact 19 to attain the desired velocity and gas flow before contact part. Upon contact part, the arc (not shown) is initially drawn between the stationary contact fingers 20 and the moving contact tip 19. Gas flow quickly transfers this arc to the arc tips resulting in a long arc, that is cooled and deionized at current zero by the flow of high-pressure $SF_6$ gas. Near the end of the moving contact travel, the blast valves 37, 38 (FIG. 16) are actuated to close and to seal off the gas flow leaving the opened contacts 19, 20 in an atmosphere of high-pressure $SF_6$ gas. The total interrupting time from trip-coil energization to arc interruption is two cycles, or less.

The breaker 1 uses high-pressure gas (240 p.s.i.g.) for primary insulation to ground, insulation across the open contacts, pressure differential for gas flow to the 5 p.s.i.g. system during arc interruption, and energy for breaker operation. $SF_6$ gas is used at an intermediate pressure of 45 p.s.i.g. for high dielectric strength in the area immediately inside the grounded tank assembly 17. There is no $SF_6$ circulation between this insulation system and the other two pressure systems.

Sulfur-hexafluoride gas in a pure state is inert and exhibits exceptional thermal stability. It has excellent arc-quenching properties. These characteristics, combined with its exceptionally-good insulating properties, make it an excellent medium for use in circuit-breakers.

Since the pressure-temperature characteristics of $SF_6$ gas may cause it to liquefy at 220 p.s.i.g. and 48° F., it is necessary to provide heat in the high-pressure gas at temperatures below 48° F. Heat is supplied by a double-element heater (not shown) disposed within the high-pressure reservoir tank 30. The heaters are automatically controlled by thermostats. Where required, pressure switches in the high-pressure system are temperature-compensated.

When the circuit-breaker 1 operates, it discharges gas from the high-pressure side to the low-pressure side, and raises the pressure in the low-pressure side. The low-pressure governor switch actuates a 11 p.s.i.g. and completes the circuit of the line-starter coil to close the line-starter, energizing the compressor motor, and pumping the gas from the low-pressure side to the high pressure side. After normal low pressure is reached (5 p.s.i.g.) the low-pressure governor switch opens to de-energize the line-starter and stop the compressor.

As mentioned, briefly, during the opening operation of each interrupter module 13, 14 or 15, the upper movable contact 19 moves upwardly away from the lower stationary contact 20, as illustrated in FIG. 17, establishing an arc therebetween (not shown), and effecting circuit interruption. Where desired, a movable isolator contact 22 (FIG. 15) may be moved to the open and closed-circuit positions by suitable mechanism, constituting no part of the present invention, and the details of which may be obtained from a study of U.S. Pat. No. 3,700,840 — Wilson, and U.S. Pat. No. 3,694,592 — Kuhn.

Preferably a highly-insulating gas 31, such as sulfur-hexafluoride (SF₆) gas, is utilized throughout the gas system, through the gas-insulated piping 3, and also within the circuit-interrupter modules 13, 14 and 15, as illustrated in FIG. 17.

Figure 4:
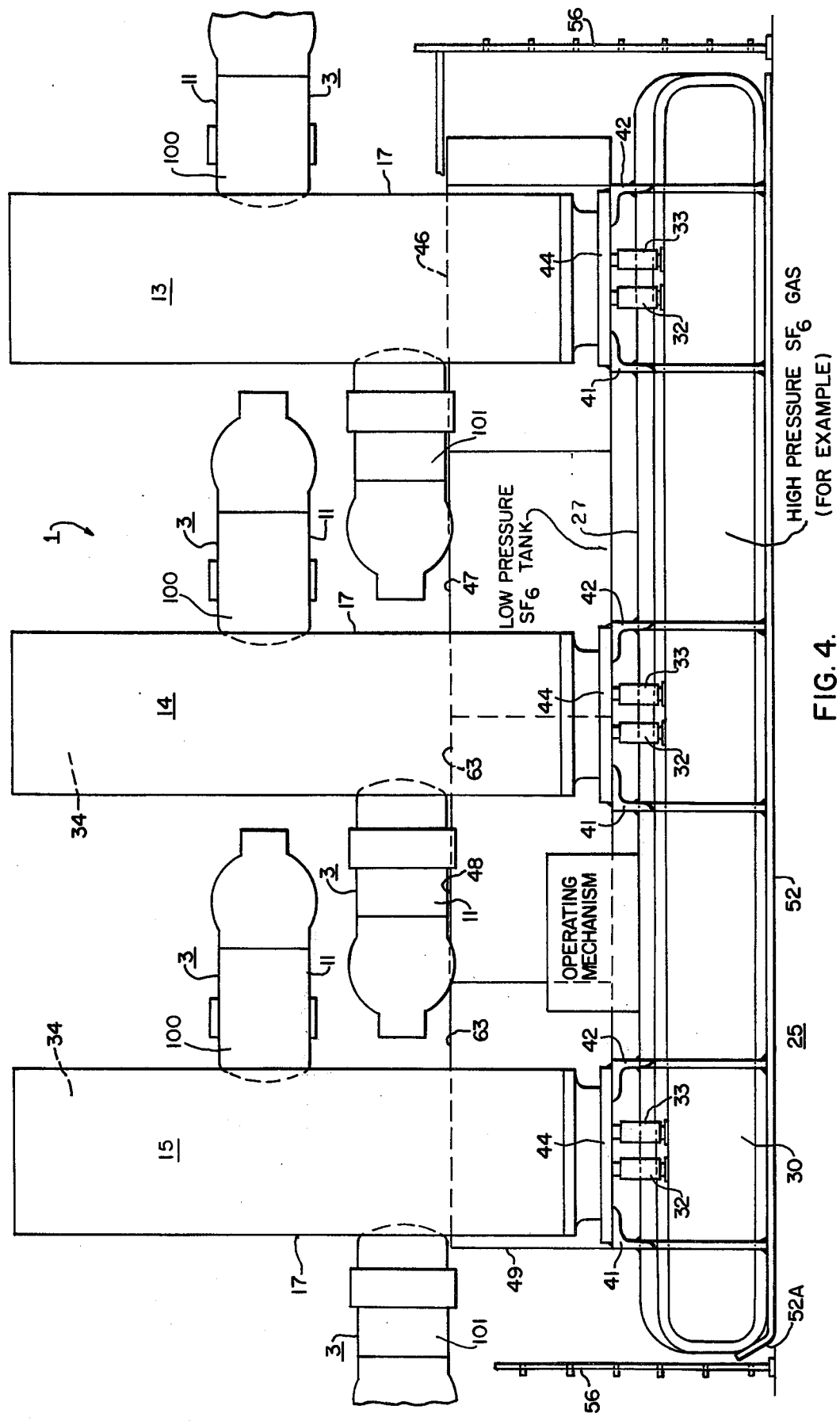
FIG. 4 is a side-elevational view of the right-hand side of the improved circuit-breaker installation of the present invention.
Figure 5:
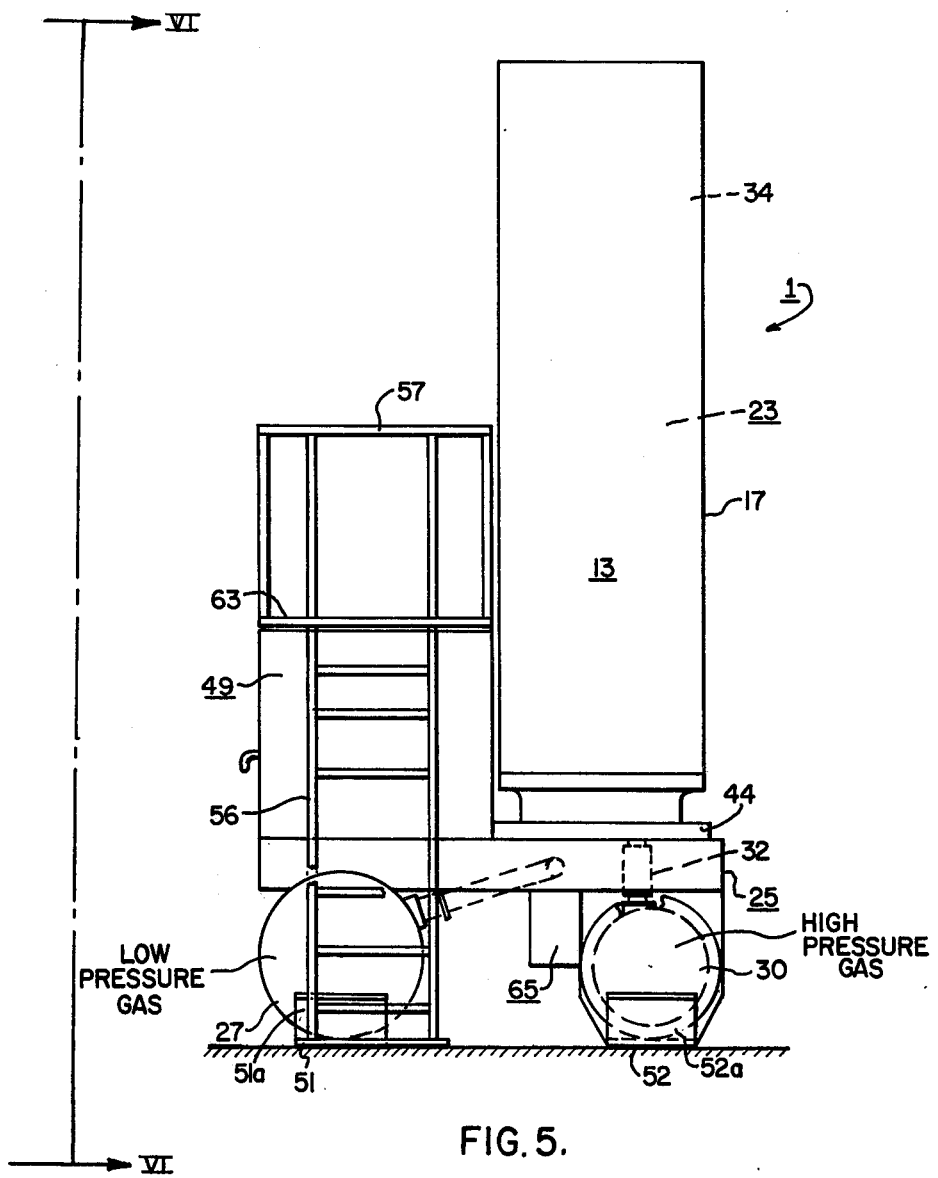
FIG. 5 is an end-elevational view of the circuit-breaker installation of FIG. 4.

With reference to FIG. 4, it will be noted that upstanding angular flange portions 41 and 42, welded to the upper side of the high-pressure gas reservoir tank 30, serve to support base plates 44, the latter, in turn, supporting the upstanding circuit-breaker assemblies 13, 14 and 15.

As viewed in FIG. 3, the control cabinets 46–49 are disposed along one side of the circuit-breaker installation 1 giving desirable accessability thereto.

Figure 6:
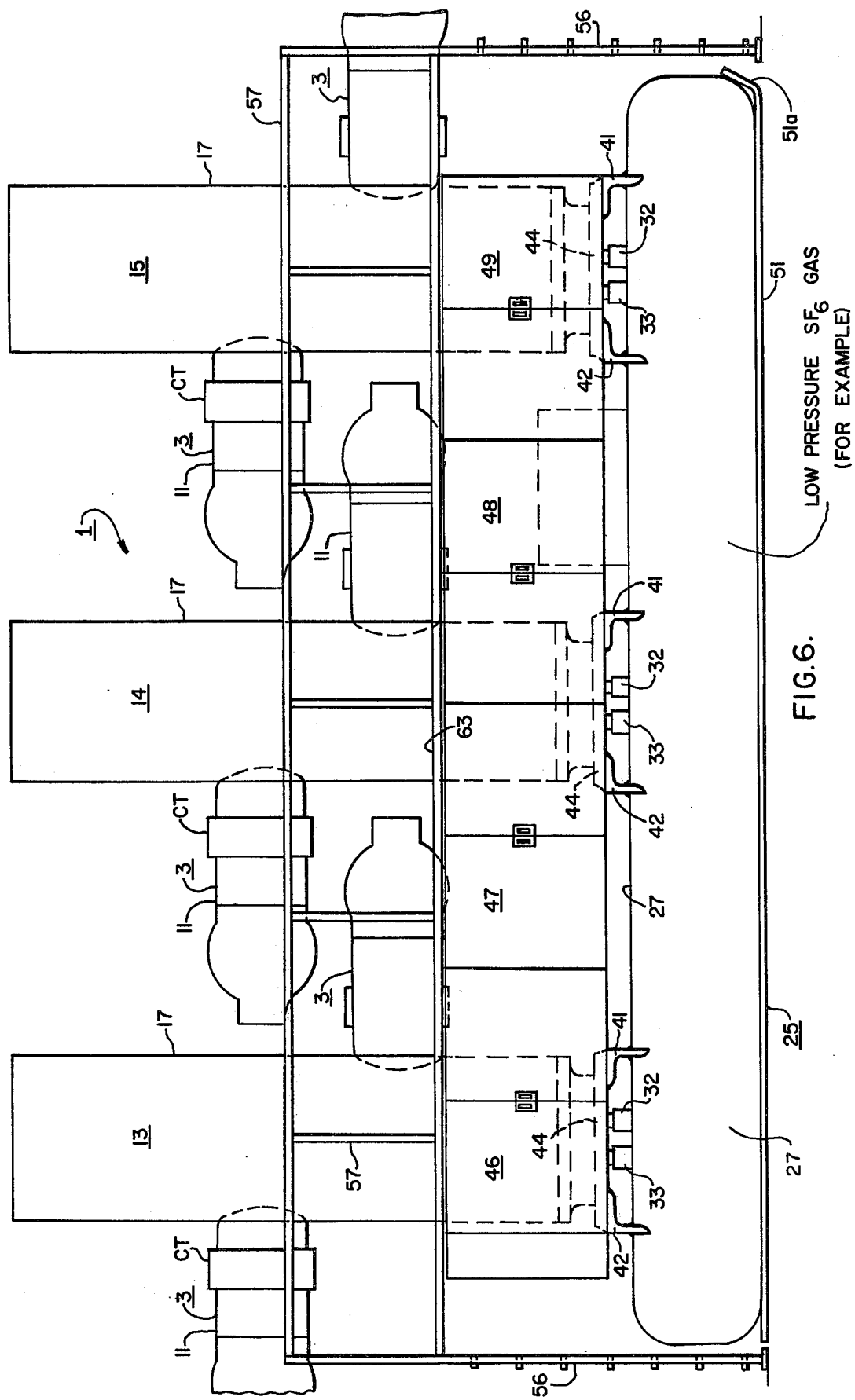
FIG. 6 is a side-elevational view taken looking toward the left-hand side of the installation of FIG. 5, generally in the direction of the arrow VI—VI of FIG. 5.
Figure 8:
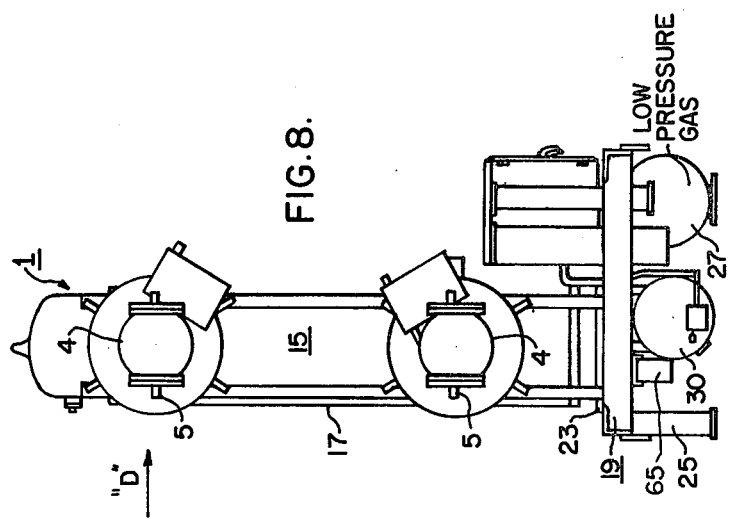
FIG. 8 is an end-elevational view looking toward the left, and the view being taken along the line VIII—VIII of FIG. 7.
Figure 9:
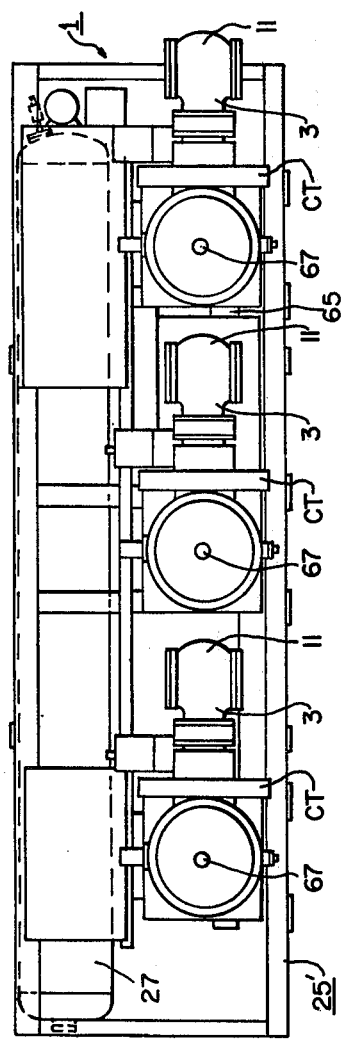
FIG. 9 is a top plan view taken looking downwardly upon the installation of FIG. 7, generally along the line IX—IX of FIG. 7.
Figure 7:
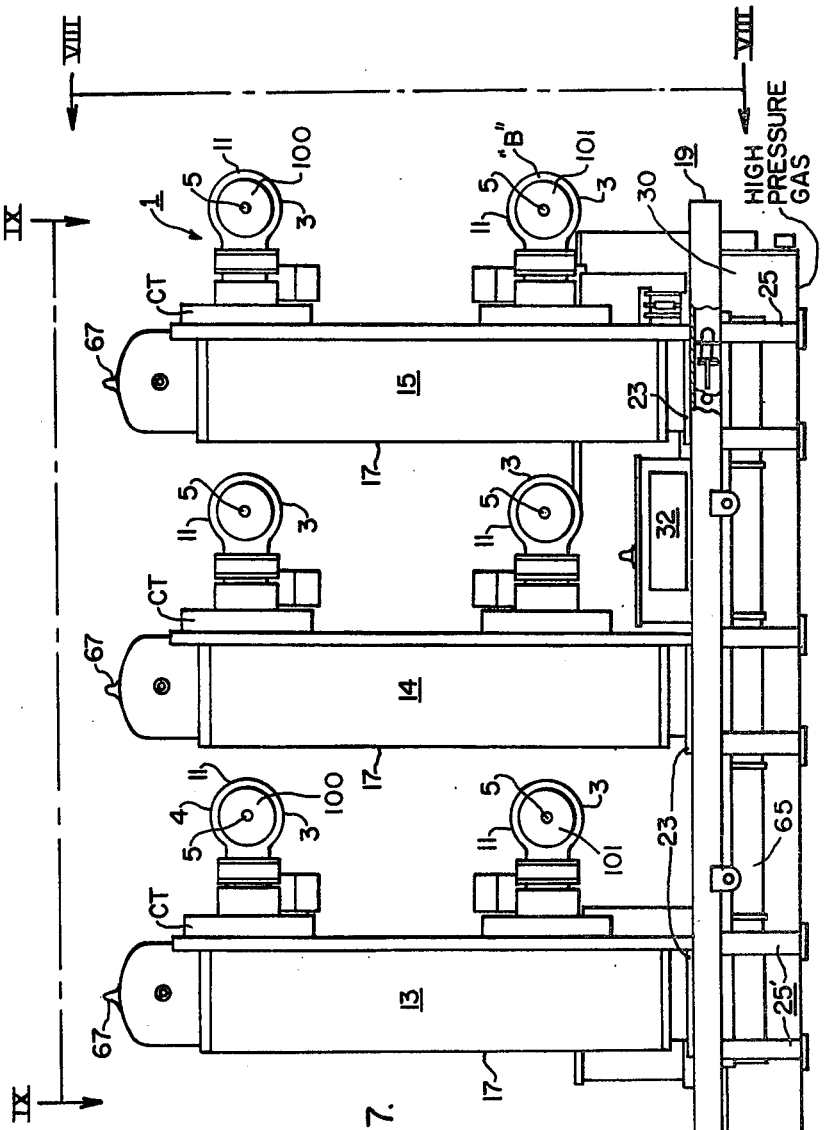
FIG. 7 is a side elevational view of a modified-type of gas-insulated circuit-breaker installation involving some of the principles of the present invention.

These cabinets 46–49 contain control equipment and also compressor facilities. As viewed in FIG. 6, the low-pressure gas tank 27 contains a base skid-plate 51 having the right-hand end 51a thereof curved up to enable sliding upon the ground, when desired.

Figure 10:
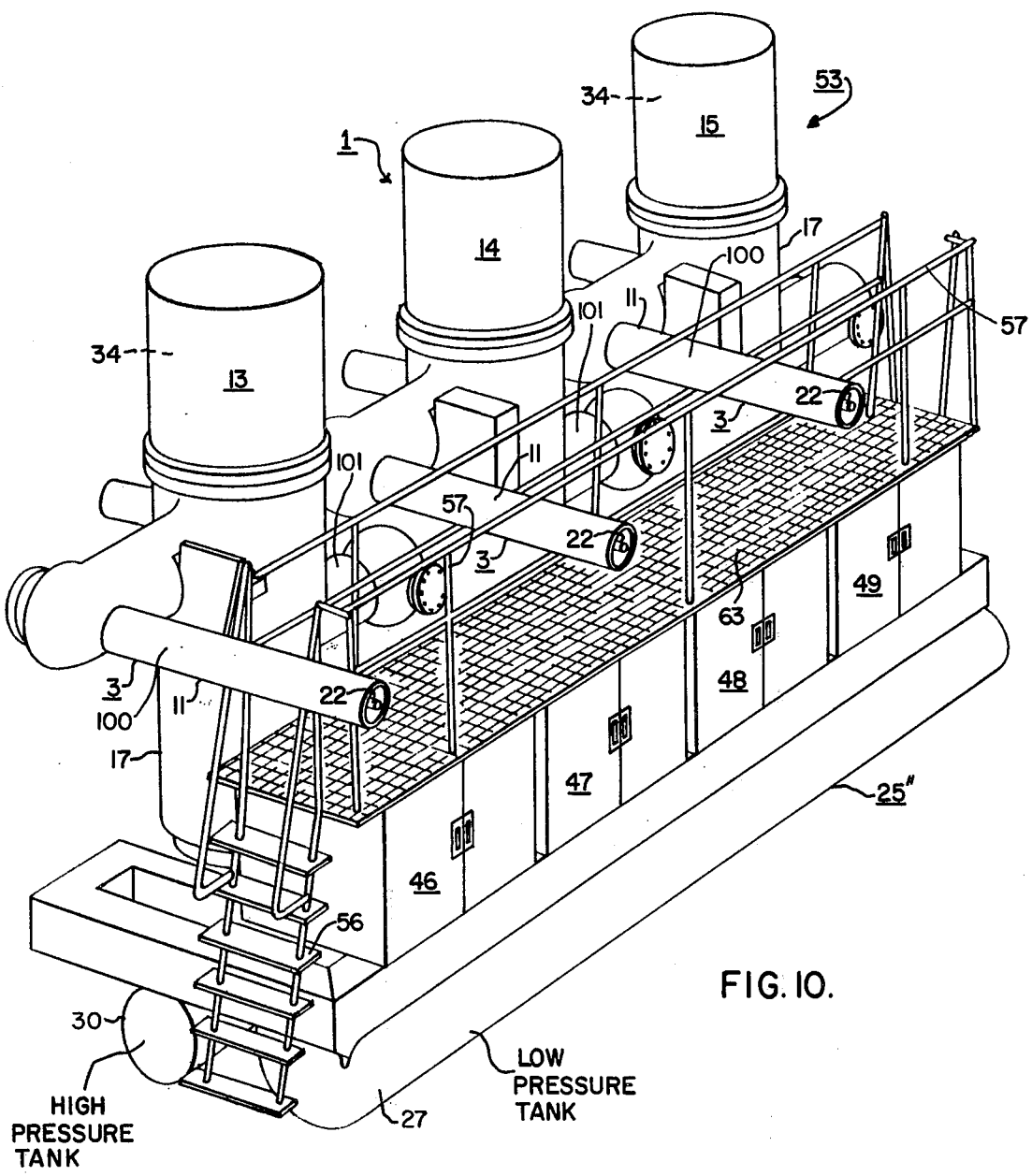
FIG. 10 is a perspective view showing, generally, a modified-type of circuit-breaker construction utilizing, generally, the principles of the present invention.
Figure 14:
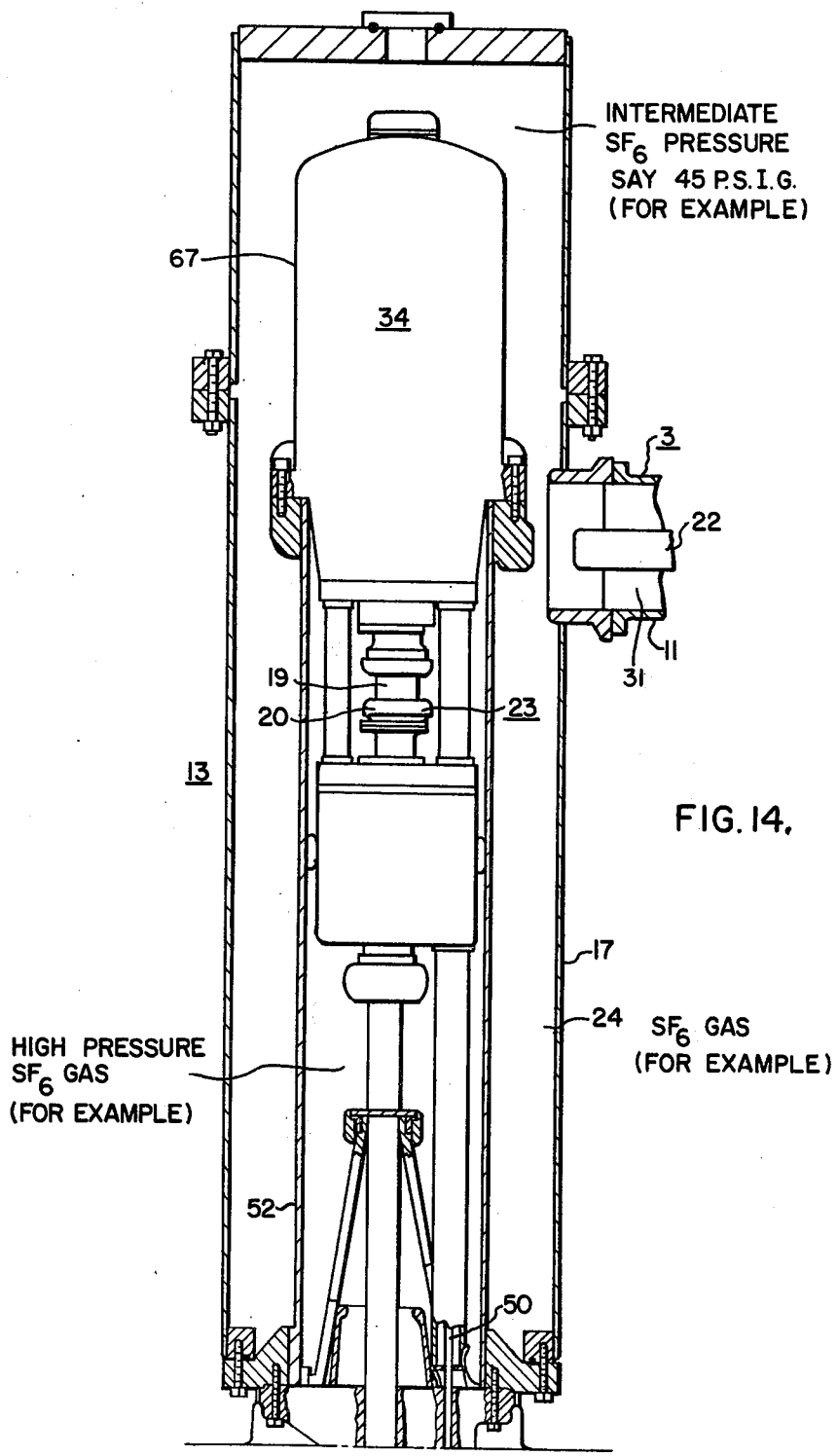
FIG. 14 is a fragmentary vertical side-elevational view, with parts broken away, of one of the circuit-breaker modules or interrupter units, the view showing the contacts in the closed-circuit position.

FIG. 10 illustrates a modified-type of construction 53 in which again the low-pressure gas reservoir tank 27 serves as a support for one side of the circuit-breaker installation 53. A stairway 56 and railing system 57 enables maintenance personnel 60 (FIG. 3) to step upon an upper platform 63, disposed above the cabinets 46–49, and to conduct test and measuring operations, when desired. It will be noted that the platform 63 is disposed above the cabinets 46–49 and provides a desired pathway.

With regard to FIGS. 11, 12 and 13, it will be observed that there is provided a horizontal mechanical linkage 65 for simultaneously actuating the control valves 66 (FIG. 15) in each of the high-potential operators 34, which are disposed in the upper cap portions of the circuit-breaker modules 23, and indicated by the reference numeral 67 in FIG. 15. With reference being had to U.S. Pat. No. 3,639,713, it will be noted that operation of the control valves 66 will provide a high-pressure gas flow to the underside of operating pistons (not shown), which, in turn actuate the moving contacts 19 upwardly in an opening direction.

The present invention is particularly concerned with a simplified arrangement for mounting a high-voltage compressed-gas multi-phase circuit-breaker installation 1, 53. It will be observed that the construction, set forth in the drawings, lends itself to a simplified type of design, and combines the function of the breaker components in a novel and functional manner. The objective is to combine functions of the breaker components 13, 14 and 15 in order to conserve space. Of particular importance is the fact that the low-pressure gas-reservoir tank 27 is so used and located as to provide a main support for the circuit-breaker structure 1. Likewise, the high-pressure gas-reservoir tank 30 is so used and located in such a manner that its main supporting brackets 41, 42 (FIG. 4) become a main support for the circuit-breaker 1. The use of the components in such a manner eliminates the costly and complicated I-beam base structure which heretofore has been required, and presents an overall breaker component arrangement in a position capable of considerable ease in maintenance.

Although there has been illustrated and described specific structures, it is to be clearly understood that the same were merely for the purpose of illustration, and that changes and modifications may readily be made therein by those skilled in the art, without departing from the spirit and scope of the invention.

We claim as our invention:

1. A multiphase compressed-gas circuit-breaker installation comprising, in combination, means defining a generally-rectangularly-shaped lower-disposed main metallic support frame, a plurality of laterally-spaced upstanding generally-cylindrically-shaped circuit-breaker assemblies (13, 14) extending upwardly from, and supported by said lower-disposed main metallic generally-rectangularly-shaped support frame, first line-terminal connecting means (100) for each circuit-breaker assembly (13, 14) disposed adjacent the upper end of the respective circuit-breaker assembly (13, 14), cooperable second line-terminal connecting means (101) disposed below the aforesaid first-mentioned first line-terminal connecting means (100), yet spaced upwardly from said main lower-disposed generally-rectangularly-shaped metallic support frame (25), pressure-operated separable power contact means for each circuit-breaker assembly disposed internally thereof and interposed between the respective pair of first and second line-terminal connecting means (100, 101), valve means provided for each circuit-breaker assembly (13, 14) for causing the actuation of the pressure-operated power contacts thereof, horizontally-extending valve-rod actuating linkage supported by said lower-disposed metallic support frame and extending generally horizontally below the several circuit-breaker assemblies (13, 14) and mechanically interconnected with the several interiorly-disposed valve means for the respective circuit-breaker assemblies (13, 14), said valve-rod actuating linkage (65) being disposed in the available space between the support frame and the foundation level, two horizontally-extending, generally-parallel, high and low-pressure gas-reservoir tanks (27, 30) extending longitudinally lengthwise of the circuit-breaker assembly and disposed below said generally-rectangularly-shaped lower-disposed support frame, gas-conduit means interconnecting said high pressure gas-reservoir tank (30) and each circuit-breaker assembly (13, 14), an operating-mechanism housing compartment disposed above the lower-disposed generally-rectangularly-shaped support frame and interposed between two adjacentally-disposed circuit-breaker assemblies, said mechanism compartment housing containing an operating mechanism for operating said horizontally-extending valve-rod linkage, and said low-pressure gas-reservoir tank (27) extending longitudinally lengthwise of said circuit-breaker installation and constituting the sole side support for said lower-disposed metallic generally-rectangularly-shaped support frame along one lower longitudinal side thereof.

2. The combination according to claim 1, wherein the high-pressure gas-reservoir tank (30) extends below each circuit-breaker assembly (13, 14), and said gas-conduit means having a laterally-spaced pair of high and low-pressure gas conduit means (32, 33) interconnecting the same.

3. The combination according to claim 2, wherein brackets (41, 42) affixed to the high-pressure gas-reservoir tank (30) support horizontal plate structure (44) which constitutes the lower support for the upstanding circuit-breaker assemblies (13, 14).

4. The combination according to claim 1, wherein the two gas-reservoir tanks (27, 30) collectively serve as the lower main base support for the generally-rectangularly-shaped lower-disposed metallic support frame of the multiphase circuit-breaker installation.

5. The combination according to claim 1, wherein a plurality of control and compressor cabinets are disposed along one side of the circuit-breaker installation above the longitudinally-extending low-pressure gas-reservoir tank (27), and platform structure (63) is disposed above the cabinet housing for maintenance service personnel during servicing operations of the circuit-breaker installation.

6. The combination according to claim 3, wherein each pair of brackets (41, 42) support a horizontal base-plate (44), which horizontal base-plate (44) upstandingly supports a respective circuit-breaker assembly (13, 14).

* * * * *